United States Patent

[11] 3,545,550

| [72] | Inventor | Philip D. Wenzel<br>Rockford, Illinois |
|---|---|---|
| [21] | Appl. No. | 727,930 |
| [22] | Filed | May 9, 1968 |
| [45] | Patented | Dec. 8, 1970 |
| [73] | Assignee | J.I. Case Company<br>Racine, Wisconsin<br>a corporation of Wisconsin |

[54] PIVOTAL COULTER LOCK-OUT ASSEMBLY
1 Claim, 3 Drawing Figs.

[52] U.S. Cl. .................................................. 172/271,
172/572, 172/710
[51] Int. Cl. .................................................. A01b 15/16
[50] Field of Search ............................................ 172/265,
271, 572, 573, 705, 710, 602

[56] References Cited
UNITED STATES PATENTS

| 445,871 | 2/1891 | Bailey et al. .................. | 172/271X |
| 1,526,639 | 2/1925 | Leebold ....................... | 172/572X |
| 2,196,713 | 4/1940 | Warne ......................... | 172/572 |
| 2,724,318 | 11/1955 | Erickson et al. ............... | 172/705X |
| 3,061,018 | 10/1962 | Olson .......................... | 172/602X |
| 3,411,589 | 11/1968 | Moe ............................ | 172/572 |
| 3,451,489 | 6/1969 | Sullivan ....................... | 172/572 |

*Primary Examiner*—Robert E. Pulfrey
*Assistant Examiner*—Alan E. Kopecki
*Attorney*—Arthur J. Hansmann ABSTRACT: A pivotal coulter lockout assembly including an agricultural implement draft frame having a pivotal member included in the frame and moveable about a vertical axis. A coulter is connected to the frame by means of support arms which are vertically pivotally mounted on the pivotal member. Cushioning means in the form of springs are shown to yieldingly urge the coulter downwardly for cutting into the ground and for riding over obstructions on the ground. A lockout means is disposed to be operative between the support arms and the pivotal member for securing the coulter in the downward position.

PATENTED DEC 8 1970
3,545,550
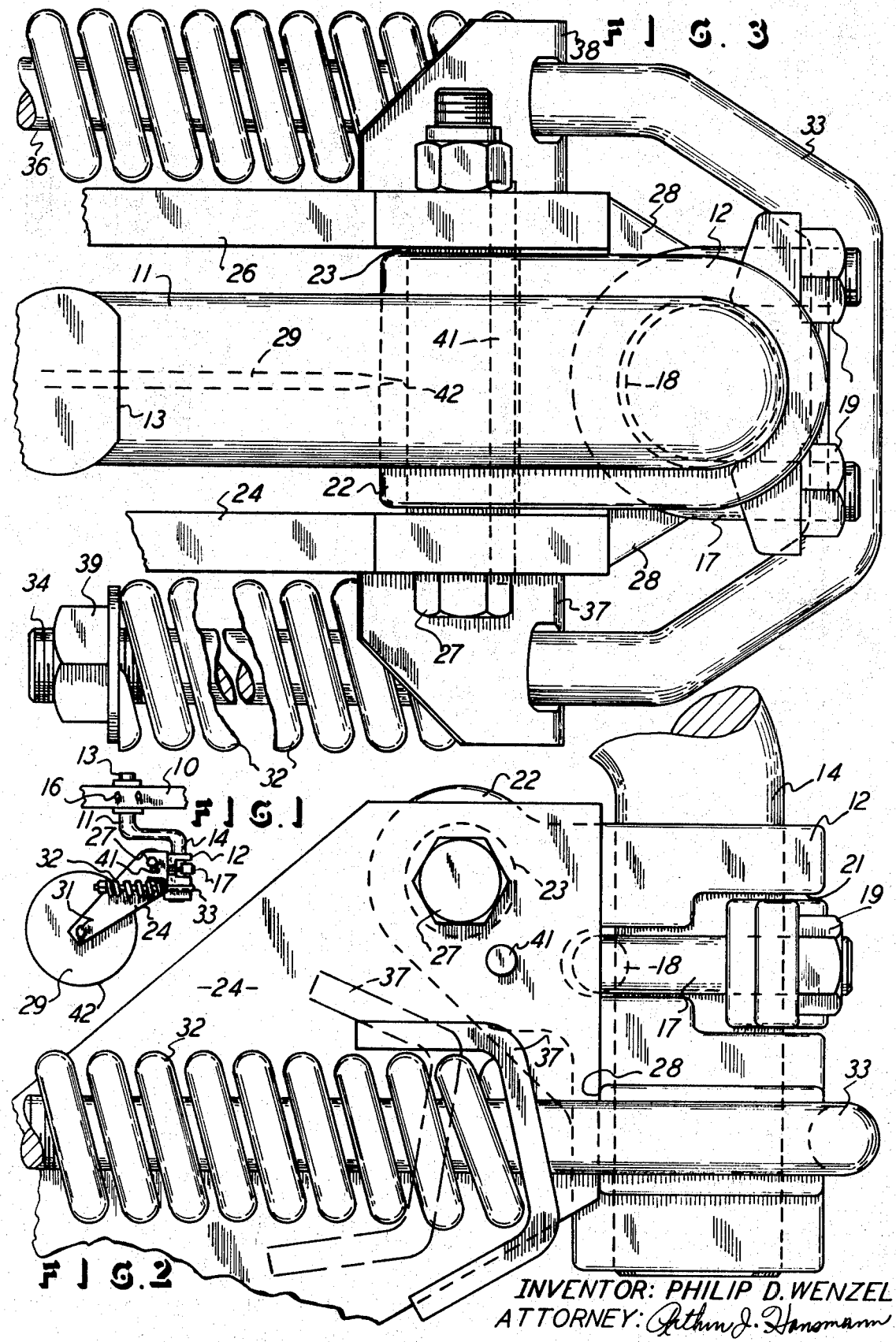
INVENTOR: PHILIP D. WENZEL
ATTORNEY: Arthur J. Hansmann

PIVOTAL COULTER LOCK-OUT ASSEMBLY

BACKGROUND OF THE INVENTION

This invention relates to an agricultural implement having a draft frame for vertically moveably mounting a coulter through pivot arms. It is a common practice to provide coulters with pivotal mountings for up and down movement to have the coulters cut into the ground and to have them to ride over obstacles on the ground. The coulter is commonly positioned in advance of a moldboard plow for cutting growth above the ground and for cutting roots underground, so that the plow can operate most effectively. These coulters are also commonly arranged so that they track or steer with respect to forward movement of the draft frame. For this purpose, the coulter is commonly mounted to be pivotal about a vertical axis for the tracking feature, as well as being pivotal about a horizontal axis for raising and lowering relative to the ground, as described. It is also common practice to provide a spring or like cushioning means effective between the coulter and the frame for yieldingly urging the coulter downwardly into the ground but still permitting it to ride over a rock or like obstacle on the ground.

The problem and concern with coulters as mentioned above are that the spring or other yielding means is commonly arranged so that the coulter will readily move upwardly when it engages rocks, debris, tree roots, or the like which cannot be easily cut by the coulter, and which would commonly damage the coulter. Therefore, the spring urging the coulter downwardly may be set or otherwise arranged so that it exerts a small downward force to retain the coulter downwardly, and such small force is commonly adequate for causing the coulter to cut the ground, as desired. However, such setting of the coulter for common operation is not always adequate for other conditions. That is, when the ground itself is hard and compacted, then it is desirable to have the coulter remain downwardly in a position to slice the ground as the implement moves forwardly. The spring itself is not always adequate to retain the coulter downwardly in hard ground.

Another problem and concern with prior art coulters are those encountered in conditions where it is desired to have the coulter cut deeply into the ground. That is, where prior art coulters are only spring urged downwardly for cutting into the ground, certain depths of cut will automatically cause the coulter to be resisted by the ground in the coulter's effort to further penetrate downwardly in the ground. In those instances, the yielding spring will give way to permit the coulter to ride in the ground at only a certain depth, depending upon ground hardness or compaction, and like conditions of coulter characteristics such as diameter, edge sharpness, angulation on the frame, and the like.

In the conditions just mentioned, it is desirable to have the coulter penetrate in the ground to a selected or desired depth, regardless of the ground conditions, rather than have the coulter penetrate the ground only in accordance with ground conditions. Therefore, an object of this invention is to provide a coulter which is an improvement on those heretofore known. A more specific object is to provide a coulter mounting assembly which overcomes the problems heretofore mentioned in connection with the prior art.

In accomplishing these objects, and in overcoming the problems and concerns aforesaid, the coulter of this invention is provided with both the vertical pivot axis for tracking with respect to the implement and with the pivot mounting for up and down movement of the coulter, combined with provisions for securing the coulter in a fixed downward position for selected and predetermined penetration of the ground by the coulter. Also, in accomplishing these objects, the present invention provides for vertically setting the coulter with respect to an implement draft frame, in conjunction with securing the coulter in a fixed or nonpivotal position on the frame, all for predetermined and selected depth penetration of the ground by the coulter.

BRIEF DESCRIPTION OF THE DRAWING

FIG. 1 is a side elevational view of a coulter mounting assembly on a draft frame which is fragmentarily shown.

FIG. 2 is an enlarged side elevational view of a fragment of FIG. 1. FIG.

FIG. 3 is a top plan view of FIG. 2.

DETAILED DESCRIPTION OF THE PREFERRED EMBODIMENT

FIG. 1 shows a portion of an agricultural implement in that it shows a draft frame, which includes a tool bar 10, a mounting standard 11, and a mounting member 12. The standard 11 is shown to be crank-shaped, and it has a vertically disposed upper end 13 and a vertically disposed lower end 14. The upper end 13 is suitably clamped to the tool bar 10 by means of bolts 16 so that the standard 11 may be vertically adjustably positioned relative to the horizontally extending tool bar 10.

The mounting member 12 is secured to the standard lower end 14, and it is pivotal thereon and about the vertical axis extending through the lower end 14. Thus, a U-shaped clamp 17 is received in a groove 18 in the standard lower end 14, as indicated in FIG. 2. The clamp 17 is secured in a fixed position on the standard lower end 14 by means of the nuts 19. The mounting member 12 is provided with a recess 21 which receives the clamp 17 and extends above and below the clamp 17 so that the member 12 is restricted in vertical movement relative to the standard lower end 14. However, the member 12 has a suitable vertical opening extending therethrough so that the member 12 can be pivotally mounted on the standard lower end 14 for pivotal movement about the vertical axis through the standard lower end 14.

The pivotal mounting member 12 is provided with a boss 22 which has an opening extending horizontally therethrough for receiving a spacer sleeve 23. The spacer sleeve 23 extends only a slight distance beyond the sides of the boss 22, as shown in the top view of FIG. 3. Coulter support members, in the form of two arms 24 and 26, are pivotally mounted on the member 12 by means of a bolt 27 extending through openings in the arms 24 and 26 and through the spacer 23. Thus the arms 24 and 26 can pivot up and down about the horizontal axis of the pivot bolt 27. The drawings show the support arms 24 and 26 to be in their downward limit position of pivot, and, in this position, the arms 24 and 26 are restricted by an abutment 28 extending on the two sides of the pivot member 12 and extending below the level of the pivot bolt 27. Thus the arms 24 and 26 cannot pivot further in a counterclockwise direction, as viewed in FIG. 2, and about the pivot bolt 27.

The other ends of the arms 24 and 26 rotatably support a coulter 29 which is mounted on the arms by means of an axle or bolt 31 extending between the arms 24 and 26 and through the center of the coulter 29, in any conventional manner of rotatably mounting a coulter.

With this much of the structure as described, it will then be understood that the implement is advanced forwardly, which would be to the right as viewed in FIG. 1. The coulter 29 would ride on the ground, and the coulter 29 is permitted to pivot upwardly when it engages an obstacle on the ground. By virtue of the pivot member 12, the coulter will steer or track with respect to the forward movement of the implement, as described.

To urge the coulter downwardly into a cutting position into the ground, a cushioning means consisting of a pair of compression springs 32 is applied between the support member consisting of the arms 24 and 26 and the frame including the pivot member 12. In this particular arrangement, the U-shaped bolt 33 extends around the member 12 and into two trailing and threaded ends 34 and 36, as shown in FIG. 3. Spring pads 37 and 38 are suitably affixed with the arms 24 and 26, respectively, to pivot with the pivotal motion of the arms 24 and 26. That is, these pads may be welded or otherwise secured to the respective arms 24 and 26, and FIG. 2 shows the pad 37 disposed in a pivoted position which represents a displaced position of the pad 37 assumed along with the pivoted position of the arm 24. Of course when the arms 24 and 26 pivot upwardly, then the springs 32 are compressed between the pads 37 and 38 and stop nuts 39 on the threaded ends 34 and 36 of the U-shaped spring mounting member 33. The springs 32 therefore urge the coulter 29 downwardly into the ground. Also, the nuts 39 are adjustable on the mounting member ends 34 and 36, so that the force of the springs may be varied.

On those occasions when it is desired to have the coulter 29 cut into packed ground, or to cut through debris such as roots in the ground, then a lockout means is provided so that the coulter 29 will remain in a downwardly fixed position with respect to the tool bar 10. For this purpose, a shear pin 41 extends through openings in the arms 24 and 26 and through an aligned opening in the member 12. The pin 41 is of course selectively positioned, to be used only when it is desired to retain the coulter downwardly. Of course the pin 41 may be in the form of a shear bolt having a head and means for retaining it axially on the members. However, the important feature is that the shear pin 41 is of a shear strength less than the shear strength of the pivot bolt 27. Thus, when the coulter 29 is subjected to an excessive force, the pin 41 will be sheared to free the coulter 29 so that it can move upwardly and thereby avoid damaging the coulter 29 or any other part of the assembly, except for the shear pin 41. Also, the shear pin 41 is located adjacent the bolt 27 so that maximum force will be applied to the shear pin 41 as the moment arm between the axes of the pivot bolt 27 and the shear pin 41 is a minimum. As shown, the shear pin 41 is located adjacent the bolt 27 to be within the diameter of the bolt 27 with reference to the showing of the diameter of the shank of the bolt 27 in FIG. 3 and the spacing of the pin 41 from the bolt 27 in FIG. 2.

Thus there is provided a means for adjusting the depth to which the coulter 29 can penetrate the ground, regardless of the resistance of the ground to coulter penetration. Such resistance would be determined by ground conditions, debris in the ground, coulter sharpness on its circumference or cutting edge 42, and even the angulation of the coulter 29 with respect to the direction of forward movement of the implement. Such depth is controlled by vertical adjustment of the standard 11 and by the lockout means in the form of a shear pin 41 which will hold the coulter 29 in a fixed position with respect to the elevation of the tool bar 10. Also, the adjustment on the U-bolt or member 33 at the ends 34 and 36 and by means of the nuts 39 will permit positioning the arms 24 and 26 so that the lockout means 41 can be positioned or removed from the position shown. Therefore, raising and lowering of the tool bar 10, along with raising and lowering of the coulter 29 and the arms 24 and 26, will not always be necessary in order to move the pin 41 when desired, for either inserting or removing the pin 41.

I claim:
1. A pivotal coulter lockout assembly, comprising an uprightly disposed standard, a coulter mounting member swively mounted on said standard for swivel movement about the upright axis of said standard, coulter support means, a pivot member extending between said coulter support means and said mounting member for uprightly pivotally mounting said coulter support means on said mounting member, a coulter rotatably mounted on said coulter support means, an abutment means on said mounting member and operative between said mounting member and said coulter support means for limiting pivot of said coulter support means in one direction, a spring adjustably operatively connected between said mounting member and said coulter support means for yieldingly urging the latter to the limited pivotal position in said one direction and thereby effect operation of said abutment means, said mounting member and said coulter support means both having a hole axially aligned with each other in said limited pivotal position, and a shear pin releasably disposed in said aligned holes for releasably setting said coulter support means in said limited pivotal position and to render said coulter support means nonpivotal on said mounting member.